US011955798B2

(12) United States Patent
Brombach et al.

(10) Patent No.: US 11,955,798 B2
(45) Date of Patent: Apr. 9, 2024

(54) DYNAMIC FAULT RIDE THROUGH BANDS FOR WIND POWER INSTALLATIONS

(71) Applicant: Wobben Properties GmbH, Aurich (DE)

(72) Inventors: Johannes Brombach, Berlin (DE); Ingo Mackensen, Aurich (DE); Kai Busker, Großefehn (DE); Hanna Emanuel, Bremen (DE)

(73) Assignee: Wobben Properties GmbH, Aurich (DE)

( * ) Notice: Subject to any disclaimer, the term of this patent is extended or adjusted under 35 U.S.C. 154(b) by 104 days.

(21) Appl. No.: 17/511,344

(22) Filed: Oct. 26, 2021

(65) Prior Publication Data

US 2022/0140602 A1 May 5, 2022

(30) Foreign Application Priority Data

Oct. 29, 2020 (EP) .................................. 20204700

(51) Int. Cl.
*H02J 3/00* (2006.01)
*H02J 3/24* (2006.01)
*H02J 3/38* (2006.01)

(52) U.S. Cl.
CPC ............ *H02J 3/0012* (2020.01); *H02J 3/241* (2020.01); *H02J 3/381* (2013.01); *H02J 2300/28* (2020.01)

(58) Field of Classification Search
CPC .......... H02J 3/0012; H02J 3/241; H02J 3/381; H02J 2300/28; H02J 3/46; H02J 3/16; H02J 3/50; F03D 7/0284; F03D 7/048; H02M 1/325; H02M 7/493; Y02E 10/72; Y02E 10/76
See application file for complete search history.

(56) References Cited

U.S. PATENT DOCUMENTS

| 10,790,668 B1 * | 9/2020 | Gadiraju ................. F03D 9/255 |
| 2010/0320762 A1 | 12/2010 | Letas et al. |
| 2010/0327584 A1 | 12/2010 | Fortmann |
| 2019/0366953 A1 * | 12/2019 | Ganireddy ................ H02J 3/40 |

FOREIGN PATENT DOCUMENTS

| CN | 102157956 B | 4/2014 |
| DE | 10 2008 034 531 A1 | 8/2009 |
| DE | 10 2016 007 098 A1 | 12/2017 |
| WO | 2019/220763 A1 | 11/2019 |

OTHER PUBLICATIONS

Alatrash et al., "Generator Emulation Controls for Photovoltaic Inverters," IEEE Transactions on Smart Grid 3(2):996-1011, Jun. 2012. (16 pages).

Vijay et al., "Performance Evaluation of Homogeneous and Heterogeneous Droop-Based Systems in Microgrid—Stability and Transient Response Perspective," IEEE Transactions on Energy Conversion 34(1):36-46, Mar. 2019. (11 pages).

* cited by examiner

*Primary Examiner* — Michael C Zarroli
(74) *Attorney, Agent, or Firm* — Seed IP Law Group LLP

(57) ABSTRACT

Provided is a method for controlling at least two frequency-converter-based infeeders. The method includes specifying a first droop for a first frequency-converter-based infeeder and specifying a second droop for a second frequency-converter-based infeeder, where the second droop is different from the first droop. The method includes, controlling the first frequency-converter-based infeeder in dependence on the first droop, and controlling the second frequency-converter-based infeeder in dependence on the second droop.

15 Claims, 4 Drawing Sheets

DYNAMIC FAULT RIDE THROUGH BANDS FOR WIND POWER INSTALLATIONS

BACKGROUND

Technical Field

The present invention relates to a method for controlling at least two frequency-converter-based infeeders.

Description of the Related Art

Frequency-converter-based infeeders such as, for example, wind power installations, wind farms or photovoltaic systems, usually have a so-called FRT (Fault Ride Through) property.

This means in particular that, during a grid fault in the electrical supply grid, the frequency-converter-based infeeders support the grid voltage of the electrical supply grid by means of an additional reactive current or an additional reactive power.

With the FRT property, the frequency-converter-based infeeder thus attempts to support the grid voltage of the electrical supply grid, i.e., to push the grid voltage of the electrical supply grid into a normal range, for example from 0.95 per unit (p.u.) to 1.05 p.u. of the nominal grid voltage, in particular by means of an additional, or increased, reactive current, or reactive power feed-in into the electrical supply grid.

In the case of usual load switch-in operations within the electrical supply grid, it can happen that the grid voltage of the electrical supply grid briefly deviates from a permissible range of the grid voltage due to a switching event such as, for example, a load switch-in operation or a topological switchover, and the FRT property of the frequency-converter-based infeeder is then triggered.

The FRT property of the frequency-converter-based infeeder is therefore triggered even through this would not be necessary. In particular, this is due to the fact that a switching event within the electrical supply grid can briefly appear to be a grid fault within the electrical supply grid.

If then there are too many frequency-converter-based infeeders having such an FRT property in a corresponding grid portion of the electrical supply grid, a simultaneous and widespread triggering of the FRT property can result in the grid voltage being supported by the frequency-converter-based infeeders, but the electrical supply grid becoming caught in an operating point that lies outside of a permissible range of the grid voltage.

In such cases there is then, for example, a permanent undervoltage at the frequency-converter-based infeeder, which causes the frequency-converter-based infeeder to disconnect from the corresponding grid portion, i.e., the electrical supply grid.

The FRT property of frequency-converter-based infeeders can therefore result in grid support being effected, but in the frequency-converter-based infeeders nevertheless unwantedly disconnecting from the electrical supply grid, which in turn can result in instabilities in the electrical supply grid, in the worst case to a blackout of the electrical supply grid.

BRIEF SUMMARY

In one or more embodiments provided herein are techniques for minimizing the effects of incorrect FRT behavior of wind power installations.

Proposed is a method for controlling at least two frequency-converter-based infeeders (frequency-converter-based feed-in devices), comprising the steps: specifying a first droop for a first frequency-converter-based infeeder, specifying a second droop for a second frequency-converter-based infeeder, wherein the second droop is different from the first droop, controlling the first frequency-converter-based infeeder in dependence on the first droop, and controlling the second frequency-converter-based infeeder in dependence on the second droop.

It is therefore proposed, in particular, to operate frequency-converter-based infeeders within an electrical supply grid by means of different droops, preferably in an interconnected system.

In particular in this case, the first droop is set, or used, to raise the voltage into a dead-band of the second droop.

In particular in this case, the second droop is set, or used, to provide a fault current. It is thereby ensured, in particular, that the frequency-converter-based infeeders within the electrical supply grid do not all react in the same way to a grid fault or a switching event that is detected, for example, by a voltage dip within the electrical supply grid. In particular, this also prevents the electrical supply grid from being destabilized by simultaneous or similar FRT properties of the frequency-converter-based infeeders, for example as a result of the grid voltage swinging up or being caught in an unstable operating point.

It is therefore proposed, in particular, to counter a sequential disconnection of a plurality of frequency-converter-based infeeders, and the resulting voltage collapse of the electrical supply grid, with different droops.

In this context, frequency-converter-based infeeders are understood herein to be all infeeders, i.e., generators, storage units (e.g., batteries or capacitor banks) and converters configured to exchange electrical power with the electrical supply grid by means of a frequency converter. These include, in particular, wind power installations, photovoltaic systems and electrical storage systems and other grid installations that have frequency converters, such as STATCOMS or FACTS.

To the extent that the frequency-converter-based infeeders have different droops, i.e., control characteristics in dependence on the grid voltage, the FRT property is deployed in an offset manner in the case, in particular, of a voltage dip within the electrical supply grid. As a result, not all frequency-converter-based infeeders react in the same way, and in particular at the same time, to a grid fault or a switching event in the electrical supply grid such as, for example, a voltage dip caused by a load connection in the electrical supply grid.

The different droops also overlap to form a total droop, i.e., an overall behavior of the frequency-converter-based infeeders. In this respect, it is also proposed to coordinate the droops in such a way that the total droop results in a behavior of the frequency-converter-based infeeders that is not harmful to the electrical supply grid.

The droops are therefore selected, in particular, with a total droop being taken into account, such that the frequency-converter-based infeeders are operated in a manner that is not harmful to the electrical supply grid.

It is therefore proposed, in particular, to coordinate the first and the second droop in such a manner that a third droop, which preferably satisfies a grid requirement, is constituted.

Preferably, the first and/or the second droop are/is realized as an FRT band or as a reactive-power voltage droop.

Preferably, the first droop has a first dead-band and the second droop has a second dead-band, wherein the first dead-band is different from the second dead-band, in particular wherein the first dead-band is smaller than the second dead-band.

It is therefore proposed in particular that, preferably, each droop has a dead-band, or dead-band range, in which the infeeder, in particular, does not change, or keeps constant, its reactive-current feed-in and/or reactive-power feed-in.

Preferably, the dead-band extends at least from 0.95 p.u. to 1.05 p.u. of the nominal grid voltage. This means, in particular, that the wind power installation does not change its reactive-current feed-in and/or reactive power feed-in because of an incident in the electrical supply grid when the grid voltage is in the normal range.

Nevertheless, the frequency-converter-based infeeder may be configured to change its reactive current feed-in and/or reactive power feed-in within the dead-band if another open-loop or closed-loop control provides for this.

Preferably, the first droop is at least portionally steeper than the second droop.

The droops thus have at least two portions, one of which is a dead-band.

In addition, the droops preferably have, besides the dead-band, another portion that is not constant.

This further portion has a slope, or steepness, and may in particular also be referred to as a closed-loop control range.

Each droop thus preferably has at least one dead-band range and one closed-loop control range.

It is additionally proposed that these closed-loop control ranges of the first and second droop have different steepnesses.

It is therefore proposed both that the closed-loop control ranges be offset from each other and that the closed-loop control ranges have different sensitivities. For example, the first droop results in an early and strong reaction of the first frequency-converter-based infeeder to an incident in the electrical supply grid, and the second droop results in a later and weaker reaction of the second frequency-converter-based infeeder to the same incident.

Preferably, the first droop is at least portionally constant.

It is thus proposed, in particular, that the first droop has yet another portion, in which the droop characteristic is constant.

The first droop thus has, in particular, a dead-band range, a closed-loop control range and a range that is not a closed-loop control range.

In a further embodiment, the regions adjoin each other seamlessly, both in the positive and in the negative direction, in particular the voltage direction.

Preferably, the first droop, and also or alternatively the second droop, is/are a reactive-current voltage droop.

The droops are therefore used, in particular, to control the reactive current, or the reactive power, of the electrical inverter by closed-loop control in dependence on the grid voltage.

In particular, the droop is used in this case to perform a reactive-current or reactive-power exchange of the frequency-converter-based infeeder with the electrical supply grid when there is a change in the grid voltage in the electrical supply grid, in particular when the grid voltage deviates from a normal range of from 0.95 p.u. to 1.05 p.u. of the nominal grid voltage.

Preferably, the first droop and the second droop are coordinated in such a way that they substantially correspond to a third droop, which in particular may be specified by a grid operator, and/or that the first droop raises the voltage within the second dead-band.

It is therefore proposed, in particular, to coordinate the droops in such a manner that the totality of all droops has a certain characteristic that in particular the frequency-converter-based infeeders to be operated on the electrical supply grid in a manner that is not harmful.

In another embodiment, the third droop is specified, for a particular grid portion of the electrical supply grid, by a grid operator, and the first and the second droop are selected in such a manner that the first and the second droop add up to the third droop.

In another embodiment, the grid operator sets requirements for the third droop for a particular grid portion of the electrical supply grid, and the first and the second droop are selected in such a manner that the first and the second droop add up to the third droop.

Preferably, the first droop, and also or alternatively the second droop, is/are substantially symmetrical in structure in the overvoltage range and the undervoltage range.

It is therefore proposed, in particular, that the droops are constructed in such a manner that the frequency-converter-based infeeders react in a substantially oppositely similar manner to a deviation from the grid voltage of a normal range for the grid voltage.

Preferably, the at least two frequency-converter-based infeeders are each realized as a wind power installation or as a wind farm.

Alternatively or additionally, the at least two frequency-converter-based infeeders are part of a wind farm.

Alternatively or additionally, the at least two frequency-converter-based infeeders form a wind farm.

Also proposed is a wind power installation, comprising at least one control unit (e.g., controller) and a feed-in unit (e.g., converter or inverter) that is connected to the control unit and that comprises a frequency converter for feeding-in electrical power, wherein the control unit is configured to store a first and/or second droop and to control the frequency converter in dependence on this droop.

The control unit is thus configured, in particular, to operate by means of a droop, in particular as described herein, which is preferably settable, in particular can be changed during operation, for example by the system operator and/or grid operator. Preferably, the first and/or the second droop are/is specified as described herein.

Also proposed is a wind farm comprising at least two wind power installations as described herein, and/or a wind-farm control unit (e.g., wind farm controller) configured to execute or participate in a method described herein.

The wind farm thus comprises two wind power installations connected via a common wind-farm grid.

The wind power installations in this case may be controlled individually or in an interconnected system.

In an embodiment, the wind farm has the first droop described herein, and another wind farm, preferably in the same grid portion, has the second droop.

BRIEF DESCRIPTION OF THE SEVERAL VIEWS OF THE DRAWINGS

The present invention is now explained exemplarily in greater detail below, on the basis of exemplary embodiments with reference to the accompanying figures, with the same references being used for assemblies that are the same or similar.

DETAILED DESCRIPTION

Figure 1:
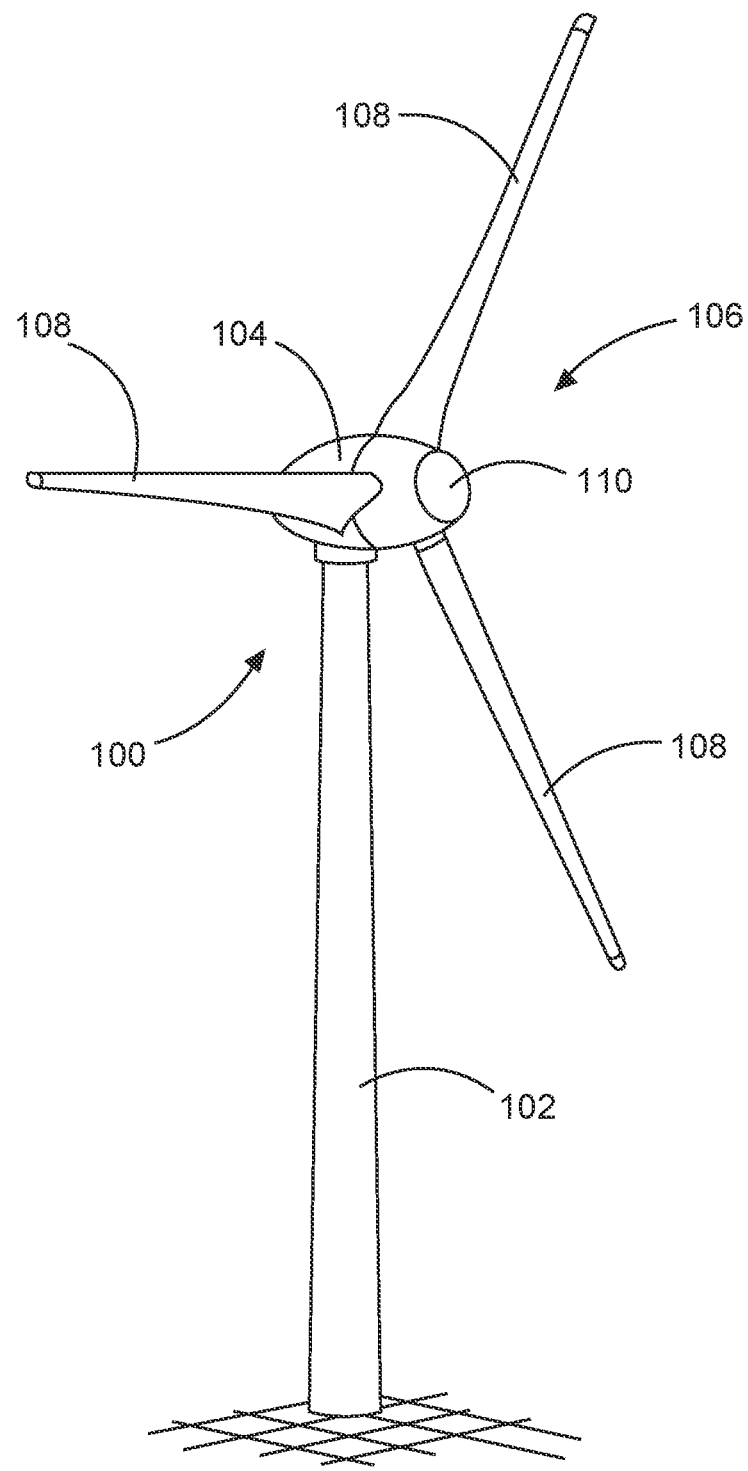
FIG. 1 shows a schematic view of a wind power installation according to an embodiment.

FIG. 1 shows a schematic view of a wind power installation 100 according to an embodiment.

The wind power installation 100 has a tower 102 and a nacelle 104.

Arranged on the nacelle 104 there is an aerodynamic rotor 106 that has three rotor blades 108 and a spinner 110.

During operation, the rotor 106 is put into rotary motion by the wind and thereby drives a generator in the nacelle 104.

The generator is also connected to a frequency converter described herein.

The wind power installation is thus realized as a frequency-converter-based infeeder (frequency-converter-based feed-in device).

For the purpose of operating the wind power installation, and in particular the frequency converter, a control unit (e.g., controller), described herein, is also provided, in particular for executing and/or participating in a method described herein.

Figure 2:
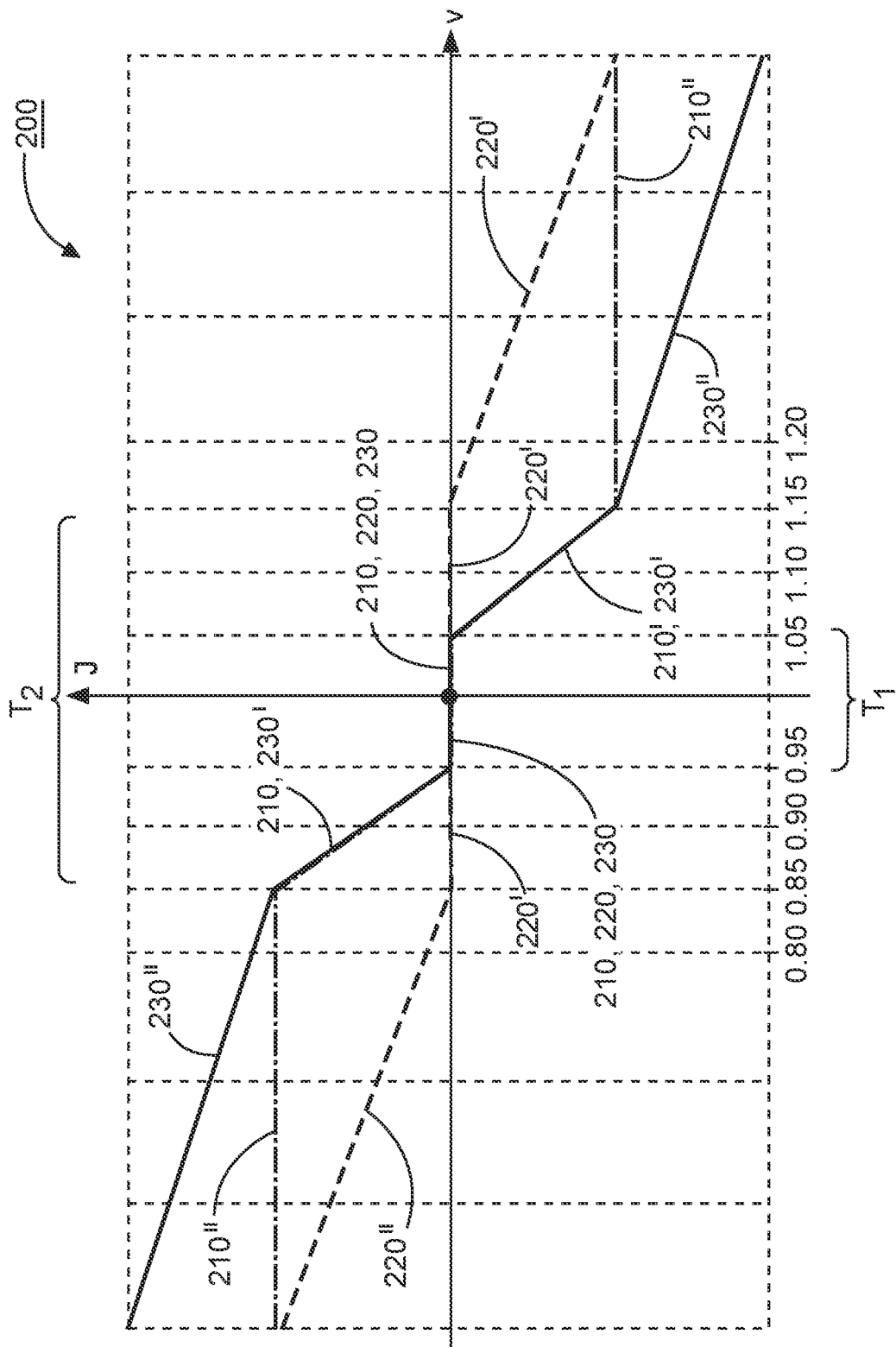
FIG. 2 shows a schematic view of two FRT two band of two wind power installations.

FIG. 2 shows a schematic view 200 of two droops, in particular FRT bands, of two wind power installations that in particular are connected to an electrical supply grid.

The schematic view 200 in this case shows, in particular, a grid-voltage reactive-current diagram, with the actual voltage of the electrical supply grid plotted on the abscissa, and the reactive current fed-in by the wind power installation plotted on the ordinate.

The first wind power installation has a first droop 210, 210', 210" with a first dead-band T1.

The first droop 210, 210', 210" in this case comprises, in particular, three portions.

The, in particular first, portion 210 of the first droop 210, 210', 210" has a constant characteristic between 0.95 p.u. and 1.05 p.u. of the actual voltage of the electrical supply grid, and may also be referred to as a dead-band T1.

The, in particular second, portion 210' of the first droop 210, 210', 210" extends linearly between 0.95 p.u. and 0.85 p.u., and between 1.05 p.u. and 1.15 p.u., and has a first slope that is other than 0.

The, in particular third, portion 210" of the first droop 210, 210', 210" has a constant characteristic between 0.85 p.u. and 0, and between 1.15 p.u. and infinity, and has a second slope equal to 0. The, in particular, third portion 210" therefore has a substantially constant characteristic.

The second wind power installation has a second droop 220, 220' with a second dead-band T2.

The second droop 220, 220' in this case comprises, in particular, two portions.

The, in particular first, portion 220 of the second droop 220, 220' has a constant characteristic between 0.85 p.u. and 1.15 p.u. of the actual voltage of the electrical supply grid, and may also be referred to as a dead-band T2 of the second droop 220, 220'.

The, in particular second, portion 220' of the second droop 220, 220' extends between 0.85 p.u. and 0, and between 1.15 p.u. and infinity.

The first dead-band T1 is thus different from the second dead-band T2; in particular, the first dead-band T1 is smaller than the second dead-band T2.

In addition, the first droop 210, 210', 210" and the second droop 220, 220' are coordinated so as to substantially correspond to a third droop 230, 230', 230" that represents, for example, the wish of a grid operator.

Figure 3:
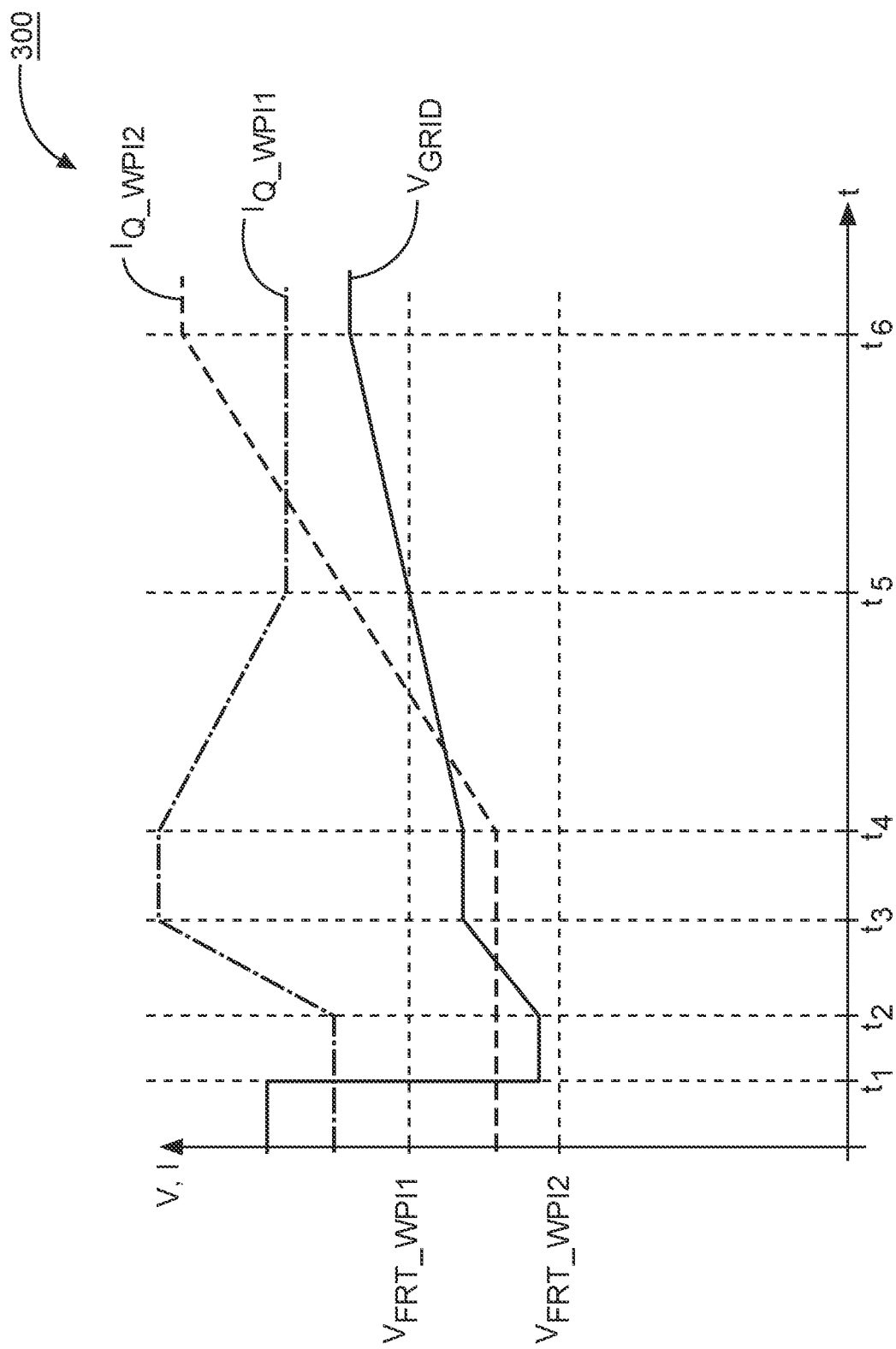
FIG. 3 shows a schematic view of the effect of the proposed method.

FIG. 3 shows a schematic view of the effect of the proposed method.

The ordinate shows the actual voltage of the electrical supply grid Vgrid and the reactive currents of the wind power installations Iq_wpi1, Iq_wpi2.

The time progression t is shown on the abscissa.

The actual voltage of the electrical supply grid Vgrid remains at the specified level until the instant t1, e.g., 0 ms, i.e., as desired by the grid operator.

At the instant t1, e.g., 0 ms, the actual voltage of the electrical supply grid Vgrid dips, e.g., due to load switching operations within the electrical supply grid.

Here, voltage goes below a first limit voltage Vfrt_wpi1 of the first wind power installation, triggering the FRT property of the first wind power installation by means of the first droop, as shown in FIG. 2.

As a result, at instant the t2, e.g., 30 ms, the first wind power installation feeds in an increased reactive current, which supports the electrical supply grid, and in particular results in a recovery of the actual voltage of the electrical supply grid.

This means that the first wind power installation is successfully supporting the electrical supply grid. Nevertheless, the first wind power installation is still in the FRT mode because the electrical supply grid still has an undervoltage. Without further additional support, e.g., from the second wind power installation, the first wind power installation would disconnect from the electrical supply grid after a fault time has elapsed.

At the instant t4, e.g., 1000 ms, the second wind power installation likewise feeds in an increased reactive current, which likewise supports the electrical supply grid and results in a further recovery of the actual voltage of the electrical supply grid.

This is due, for example, to a higher-order voltage closed-loop control of the wind farm, for example a Q(V) control, as the second part of the wind power installations does not operate in fault mode and can thus continuously support the voltage via the wind-farm closed-loop control.

At the instant t6, e.g., 4000 ms, the actual voltage of the electrical supply grid then returns to the specified range.

The fact that the two wind power installations react differently to the same voltage dip is due to the previously described droops and the reaction of the higher-order closed-loop control.

Figure 4:
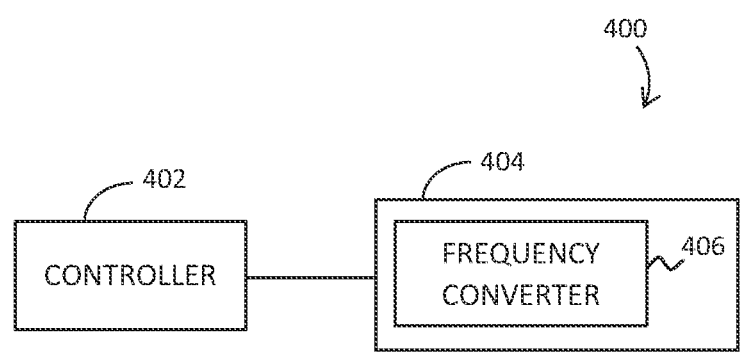
FIG. 4 shows a block diagram of a wind power installation.

FIG. 4 shows a block diagram of a wind power installation 400. The wind power installation 400 includes at least one control unit (e.g., controller) 402 and a feed-in unit (e.g., converter or inverter) 404 that is connected to the control unit 402 and that comprises a frequency converter 406 for feeding-in electrical power. The control unit 402 is configured to store a first and/or second droop and to control the frequency converter in dependence on this droop.

LIST OF REFERENCES 100 wind power installation
102 tower, in particular of a wind power installation
104 nacelle, in particular of a wind power installation 106 aerodynamic rotor, in particular of a wind power installation
108 rotor blade, in particular of a wind power installation
110 spinner, in particular of a wind power installation
210 first portion of the first droop
210' second portion of the first droop
210" third portion of the first droop
220 first portion of the second droop
220' second portion of the second droop
230 first portion of the third droop, in particular of the overall droop
230' second portion of the third droop, in particular of the overall droop
230" third portion of the third droop, in particular of the overall droop
T1 dead-band of the first droop
T2 dead-band of the second droop
Vgrid actual voltage, in particular of the electrical supply grid
Vfrt_wpi1 limit voltage, in particular of the first wind power installation
Vfrt_wpi2 limit voltage, in particular of the second wind power installation
Iq_wpi1 reactive current of the first wind power installation
Iq_wpi2 reactive current of the second wind power installation
t time The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling at least two frequency-converter-based feed-in devices, comprising:
    setting a first droop for a first frequency-converter-based feed-in device of the at least two frequency-converter-based feed-in devices;
    setting a second droop for a second frequency-converter-based feed-in device of the at least two frequency-converter-based feed-in devices, wherein the second droop is different from the first droop; and
    controlling the first frequency-converter-based feed-in device based on the first droop, and controlling the second frequency-converter-based feed-in device based on the second droop, wherein:
    the first droop has a first dead-band,
    the second droop has a second dead-band, and
    the first dead-band is different from the second dead-band.

2. The method as claimed in claim 1, wherein the first dead-band is shorter than the second dead-band.

3. The method as claimed in claim 1, wherein at least a portion of the first droop is steeper than the second droop.

4. The method as claimed in claim 1, wherein at least a portion of the first droop is constant.

5. The method as claimed in claim 1, wherein the first droop is a reactive-current voltage droop.

6. The method as claimed in claim 1, wherein the second droop is a reactive-current voltage droop.

7. The method as claimed in claim 1, comprising:
    coordinating the setting of the first droop and the second droop such that the first droop and the second droop jointly substantially correspond to a third droop.

8. The method as claimed in claim 7, wherein:
    the third droop is set by a grid operator, and/or
    the first droop raises a voltage within the second dead-band of the second droop.

9. The method as claimed in claim 1, wherein the first droop, the second droop or both the first and second droops are substantially symmetrical in an overvoltage range and an undervoltage range.

10. The method as claimed in claim 1, wherein the at least two frequency-converter-based feed-in devices are each a wind power installation or a wind farm.

11. The method as claimed in claim 1, wherein the at least two frequency-converter-based feed-in devices are part of a wind farm.

12. The method as claimed in claim 1, wherein the at least two frequency-converter-based feed-in devices form a wind farm.

13. A wind power installation, comprising:
    at least one controller; and
    a feed-in device coupled to the controller and including a frequency converter for feeding-in electrical power, wherein the controller is configured to:
        store at least one droop selected from a first droop and a second droop; and
        control the frequency converter based on the at least one droop,
    wherein:
        the first droop has a first dead-band,
        the second droop has a second dead-band, and
        the first dead-band is different from the second dead-band.

14. The wind power installation as claimed in claim 13, wherein the feed-in device is an inverter or a converter.

15. A wind farm, comprising:
    at least two wind power installations including the wind power installation as claimed in claim 13; and
    a wind-farm controller.

* * * * *